Aug. 26, 1930.   H. SCHLAICH   1,773,756
INDICATING DEVICE
Filed Dec. 22, 1928   2 Sheets-Sheet 1
Fig. 1.
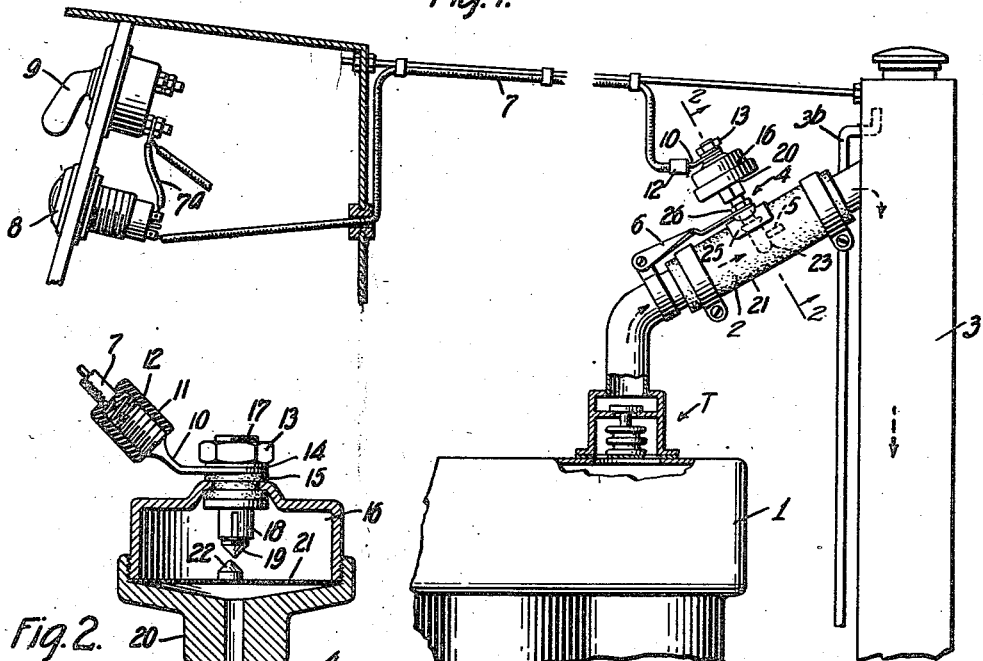
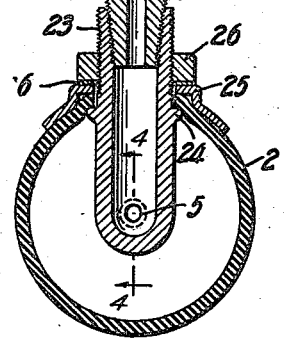
Fig. 2.
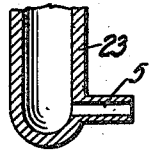
Fig. 4.
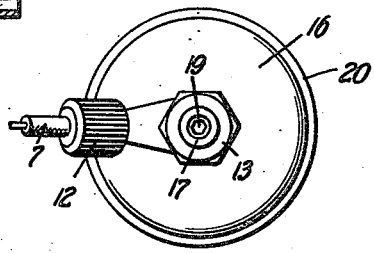
Fig. 3.
Herman Schlaich
INVENTOR
BY *Moser & Nolte*
ATTORNEYS Aug. 26, 1930.   H. SCHLAICH   1,773,756
INDICATING DEVICE
Filed Dec. 22, 1928   2 Sheets-Sheet 2

Herman Schlaich.
INVENTOR
BY Moses & Nolte.
ATTORNEY

Patented Aug. 26, 1930

1,773,756

UNITED STATES PATENT OFFICE

HERMAN SCHLAICH, OF LONG ISLAND CITY, NEW YORK

INDICATING DEVICE

Application filed December 22, 1928. Serial No. 327,785.

This invention relates to indicating devices used to inform the driver of a motor vehicle of a critical condition existing in the water-cooling system of the motor. Means are provided whereby the driver of a car receives notice by an indicating device, which may be mounted on the dashboard of the car or in any other desired location conveniently near the driver's seat when conditions dangerous to further operation occur. It has particular reference to indicating devices in which the signal device is actuated by pressure in the cooling system caused by the generation of steam therein, which occurs when the cooling liquid boils.

With an indicator of the type referred to, the driver receives a signal when the danger point is reached regardless of the fact that the temperature at which boiling occurs varies in accordance with the cooling liquid used, and the altitude at which the vehicle is operated.

The present invention is in the nature of an improvement upon indicators of this type as disclosed in my pending applications: Serial No. 478,430, filed June 17, 1921, for Indicating device; Serial No. 72,669, filed December 2, 1925, for Warning instrument for vehicle motors; Serial No. 232,914, filed November 12, 1927, for Warning instrument for vehicle motors; and Serial No. 253,946, filed February 13, 1928, for Combined temperature and danger indicating means.

It is desirable in order that an accurate and reliable indication of the occurrence of boiling may be secured that the indicator be actuated only in response to steam pressure occurring in the cooling system, and that provision be made for avoiding actuation of the pressure sensitive device by the dynamic force of the water circulating in the cooling system, so that false indications will not be given.

Such a result can be obtained by mounting the pressure sensitive device to be exposed only to the pressure of the air or vapor in the air space at the top of the radiator. If the instrument is to be of the distance type, however, such an arrangement involves the necessity either of running wires to the top of the radiator or of running a pressure tube from some accessible point of the cooling system up into the air space. Either of these constructions involves labor and material expense which it is the object of the present invention to avoid.

In accordance with the present invention, the pressure sensitive device may be provided with a mouth piece adapted to penetrate a conduit of the cooling system underneath the hood, and to be immersed in the cooling liquid itself. The mouth piece is so constructed and disposed as to avoid actuation of the pressure sensitive device by the dynamic force of the water. This is accomplished in the illustrative embodiment of the invention by providing the mouth piece with a short extension which opens in the direction of flow of the water. With such an arrangement it is impossible for the velocity of the water to cause pressure to be exerted upon the pressure sensitive device. On the contrary, the velocity will cause some suction to be exerted. This suction is not sufficient, however, to offset the static pressure which occurs generally throughout the cooling system when steam is formed therein, and, therefore, does not interfere with the reliability of the device for indicating the occurrence of boiling.

Fig. 1 is a schematic diagram partly in section showing one embodiment of this invention;

Fig. 2 is a view of the pressure device, partly in section, along lines 2—2 of Fig. 1, showing in more detail the means for actuating the signal indicating device;

Fig. 3 is a plan view of the signal actuating, or pressure device;

Fig. 4 is a cross-section along lines 4—4 of Fig. 2.

Similar reference numerals refer to similar parts in all of the figures.

Figure 5:
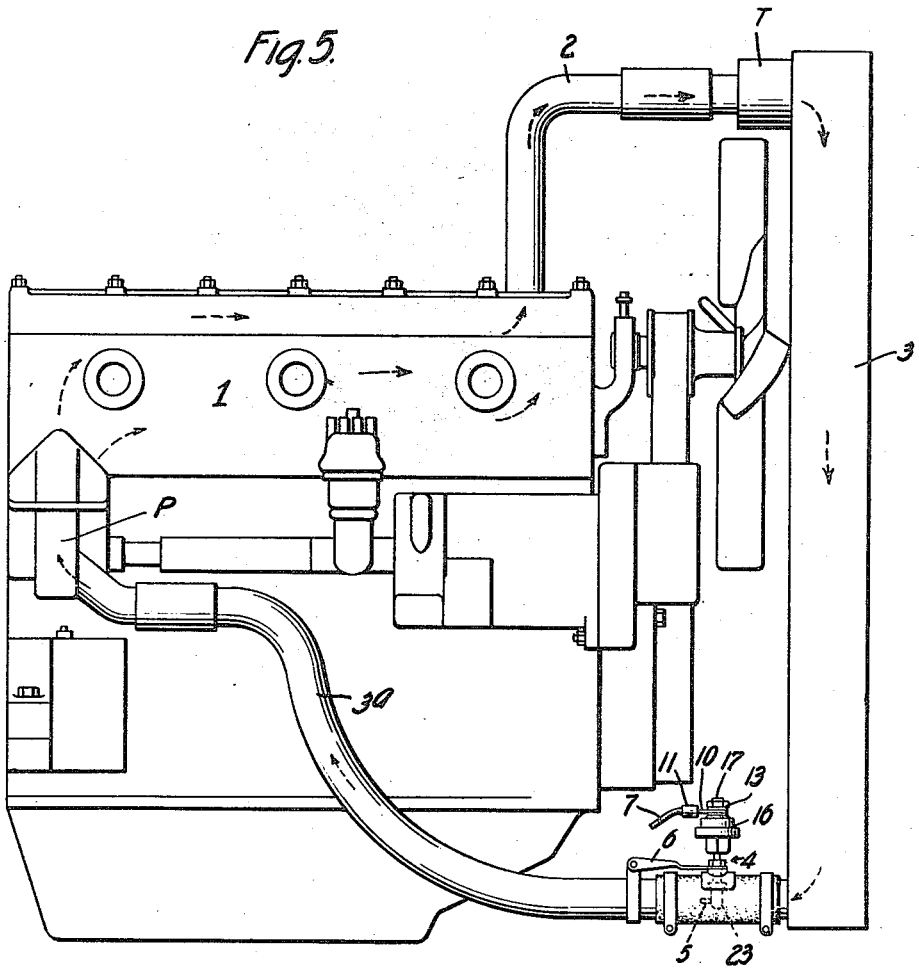
Fig. 5 is a schematic diagram, partly in section, of the signal actuating device of this invention, mounted at a different position in a cooling system.

In the drawings a water pump P (Figure 5) forces water through the cooling system of a car in the direction shown by the arrows (Figs. 1 and 5) through a water jacket 1, hose connection 2, radiator 3, and back through a conduit 3ª to the pump. An overflow pipe 3ᵇ communicates with the upper portion of the radiator to limit the height to which water may rise in the radiator, and this overflow pipe also serves as a vent for maintaining the pressure applied to the cooling liquid normally equal to that of the atmosphere. When steam is generated more rapidly than it can be conducted away by this pipe pressure builds up in the entire cooling system. Mounted on the hose connection 2 of Fig. 1 is a pressure device 4, having a mouthpiece 5 opening in the direction of the flow of the water. An insulated conductor 7 is electrically connected to the upper section of the pressure device and to one terminal of a signal light 8 on the dashboard. The other terminal of the signal light 8 is connected by a conductor 7ª to the ignition switch 9 on the car. When the ignition switch is turned on for the operation of the engine, the light will be in series with the battery and the pressure device, and when this circuit is completed, as it is upon the occurrence of steam pressure in the cooling system, the signal light 8 will be energized. The conductor 7 is connected to the upper section of the pressure device through a conducting arm 10 (Fig. 2) which terminates in a threaded plug 11 adapted to engage an insulated, internally threaded socket 12 through one end of which the conductor 7 passes. The conductor terminates in a spring inside the socket which serves to lock the plug and socket together and to assure the electrical contact. The arm 10 is mounted on a threaded member 17 to which it is secured by means of a nut 13 and washer 14. Mounted on said member 17 is an insulated collar 15 having a circular groove in its periphery adapted to engage a cup 16 and electrically insulate the member 17 therefrom. The member 17 terminates in an internally threaded section 18 in which a contact element 19 is screwed.

The cup 16 is externally threaded to engage a hollow conductive body member 20, with its rim resting on a diaphragm 21 of electrically conducting material mounted therein. The diaphragm has connected thereto a second contact element 22. The lower portion of the body member is externally threaded to engage a lower section 23 of the pressure device, which is likewise hollow, and has a mouth piece 5 as heretofore described. This lower section is provided with a shoulder 24 which may be forced through the hose connection 2 and secured to prevent leakage of water by means of a clamping or steadying plate 25 and a clamping nut 26. An electrical connector 6 is mounted between the plate 25 and the nut 26, and is grounded, thus placing contact member 22 in electrical connection with the grounded side of the battery (not shown).

On some types of automobiles a thermostat is mounted in the cooling system to prevent or obstruct the circulation of the cooling liquid through the radiator when the liquid is below a certain temperature. It is important that the pressure device be located in the system between the thermostat and the intake side of the pump. If located between the thermostat and the discharge side of the pump the obstruction to flow introduced by the thermostat is apt to produce so great a back pressure of the cooling liquid that the pressure operated warning device will be operated and will lead the operator to believe that the liquid is boiling when in fact it is not warm enough to operate the thermostat and permit free circulation through the radiator. The thermostat is indicated at T in Figure 1.

On some cars the thermostat is so close to the radiator that it is not feasible to mount the pressure responsive element between the thermostat and the radiator. Fig. 5 shows how a device such as has been described may be mounted in a cooling system of this kind to secure the desired signal without liability of a premature, and therefore deceptive signal being given.

In this figure the motor construction is generally the same as that of Figure 1, with the single exception that the thermostat T is located immediately adjacent the radiator, that is, the thermostat is so situated that the pressure device could not be mounted in the conduit 2 without being situated between the outlet side of the pump and the thermostat. It has been found, however, that where this situation obtains, the pressure device may be mounted in the conduit 3ª between the radiator 3 and the intake side of the pump P. In this installation, as in the installation already described, the mouthpiece 5 extends and opens in the direction of flow of the water, that is, toward the intake side of the pump P.

In all other respects the motor and the instrument may be the same as those disclosed in Figures 1 to 4. Hence corresponding reference numerals have been applied to the various parts so that no reiteration of the detailed description is deemed necessary.

The operation of the device when mounted in either location described is as follows:

When the cooling liquid is circulating in the system (when the engine is running) it flows past the mouthpiece 5 in such a direction that a suction is formed in the pressure device and no indication is given. When the temperature of the cooling liquid rises to the point at which steam is accumulated in the air space at the top of the radiator pressure is developed which is applied throughout the cooling system. This pressure is applied to the pressure diaphragm 21 through the open mouth of the mouthpiece 5. The diaphragm yields to this pressure and contact is made between the contact elements 19 and 22. This completes an electrical circuit including the battery (not shown), and the signal light 8, and the light gives the desired signal to the driver.

The provision and disposition of the mouthpiece 5 is an important feature of this invention, since it may be submerged in the stream of liquid impelled by the pump and yet prevent the application of pressure to the diaphragm 21 before the danger point is reached. This is important where electrical transmission of the signal is employed as illustrated herein, because it is an inexpensive construction and yet obviates the necessity of running the wires through the radiator or outside the hood.. Such necessity occurs if the instrument is mounted on the radiator cap to be acted on directly by the steam in the air space. The feature is also an important one, however, in any instrument of the distance type because it facilitates installation and shortens the connections to the instrument board, and thereby effects a substantial economy.

The feature has utility in conjunction with all liquid cooled motors, whether the circulation is induced by a pump or by thermo-syphon action.

It will be understood that variations may be resorted to within the scope of the invention and that parts of the improvement may be used without others.

What is claimed is:

1. In combination, a motor having a cooling system in which a cooling liquid circulates, a signal device, and a pressure responsive device for operating the signal, said pressure responsive device including a mouthpiece situated within the cooling system and extending in the normal direction of flow of the cooling liquid.

2. In combination, a cooling system including a radiator, a pump, and a thermostat for obstructing flow of cooling liquid to the radiator, and an indicating instrument including an indicator and a pressure responsive operating device therefor, the pressure responsive device including a pressure transmitting member which is submerged in the cooling liquid beyond the thermostat from the delivery side of said pump and which has an open mouth facing in the direction of the normal flow of the cooling liquid.

3. The combination with an internal combustion motor having a circulatory cooling system, including a water jacket, a radiator, a conduit connecting the water jacket and the radiator, and a pump for causing the liquid to circulate, of an indicator to warn of dangerous operating conditions, and means for operating the indicator in response to steam pressure occurring in the cooling system, comprising a pressure responsive device and a mouth piece penetrating a conduit of the cooling system for communicating pressure to said device, said mouth piece opening only in the direction of flow of the cooling liquid whereby false indications due to the dynamic pressure of the cooling liquid are avoided.

4. The combination with an internal combustion motor having a circulatory cooling system, including a water jacket, a radiator, a conduit connecting the water jacket and the radiator, and a pump for causing the liquid to circulate, of an indicator to warn of dangerous operating conditions, and means for operating the indicator in response to steam pressure occurring in the cooling system, comprising a pressure responsive device and a mouth piece penetrating a conduit of the cooling system for submergence in the cooling liquid to transmit the pressure thereof to the pressure responsive device, said mouth piece including means for preventing application of the pump pressure to the pressure responsive device.

5. The combination with an internal combustion motor having a circulatory cooling system, including a water jacket, a radiator, a conduit for conducting the cooling liquid from the radiator to the water jacket, a second conduit for conducting the cooling liquid from the water jacket to the radiator, a pump in the first conduit for feeding the cooling liquid to the water jacket, and a thermostat in the second conduit for impeding the flow of cooling liquid to the radiator in accordance with the thermal condition of the motor, of a warning indicator, and means for operating said indicator, comprising a pressure responsive device, and means for transmitting pressure from the cooling liquid to said device, comprising a mouth piece mounted in the cooling system between the thermostat and the intake side of the pump, and opening in the direction of flow of the cooling liquid but not in the opposite direction, for preventing actuation of the pressure responsive device by the pump pressure.

6. The combination with an internal combustion motor having a circulatory cooling system, including a water jacket, a radiator, a conduit for conducting the cooling liquid from the radiator to the water jacket, a second conduit for conducting the cooling liquid from the water jacket to the radiator, a pump in the first conduit for feeding the cooling liquid to the water jacket, and a thermostat in the second conduit for impeding the flow of cooling liquid to the radiator in accordance with the thermal condition of the motor, of a warning indicator, and means for operating said indicator, comprising a pressure responsive device, and means for transmitting pressure from the cooling liquid to said device, comprising a mouth piece mounted in the first mentioned conduit at the intake side of the pump, and opening toward the pump.

7. The combination with an internal combustion motor having a circulatory cooling system, including a water jacket, a radiator, and conduits connecting the water jacket and the radiator, of an indicator to warn of dangerous operating conditions, and means for operating the indicator in response to steam pressure occurring in the cooling system, comprising a pressure responsive device and a mouth piece penetrating a conduit of the cooling system for communicating pressure to said device, said mouth piece opening only in the direction of flow of the cooling liquid whereby false indications due to the dynamic pressure of the cooling liquid are avoided.

8. The combination with an internal combustion motor having a circulatory cooling system, including a water jacket, a radiator, a conduit for conducting the cooling liquid from the radiator to the water jacket, a second conduit for conducting the cooling liquid from the water jacket to the radiator, and a thermostat in the second conduit for impeding the flow of cooling liquid to the radiator in accordance with the thermal condition of the motor, of a warning indicator, and means for operating said indicator, comprising a pressure responsive device, and means for transmitting pressure from the cooling liquid to said device, comprising a mouth piece submerged in the cooling lqiuid at the opposite side of the thermostat from the water jacket and opening in the direction in which the cooling liquid flows.

In testimony whereof I have affixed my signature to this specification.

HERMAN SCHLAICH.